May 16, 1961

E. A. MATECKI 2,984,574

SHIRRED CELLULOSIC SAUSAGE CASING AND
METHOD OF MANUFACTURE

Filed Oct. 20, 1958

INVENTOR.
EDWARD A. MATECKI

BY

ATTORNEY

INVENTOR
EDWARD A. MATECKI
BY
ATTORNEY

May 16, 1961
E. A. MATECKI
2,984,574
SHIRRED CELLULOSIC SAUSAGE CASING AND
METHOD OF MANUFACTURE
Filed Oct. 20, 1958
8 Sheets-Sheet 3
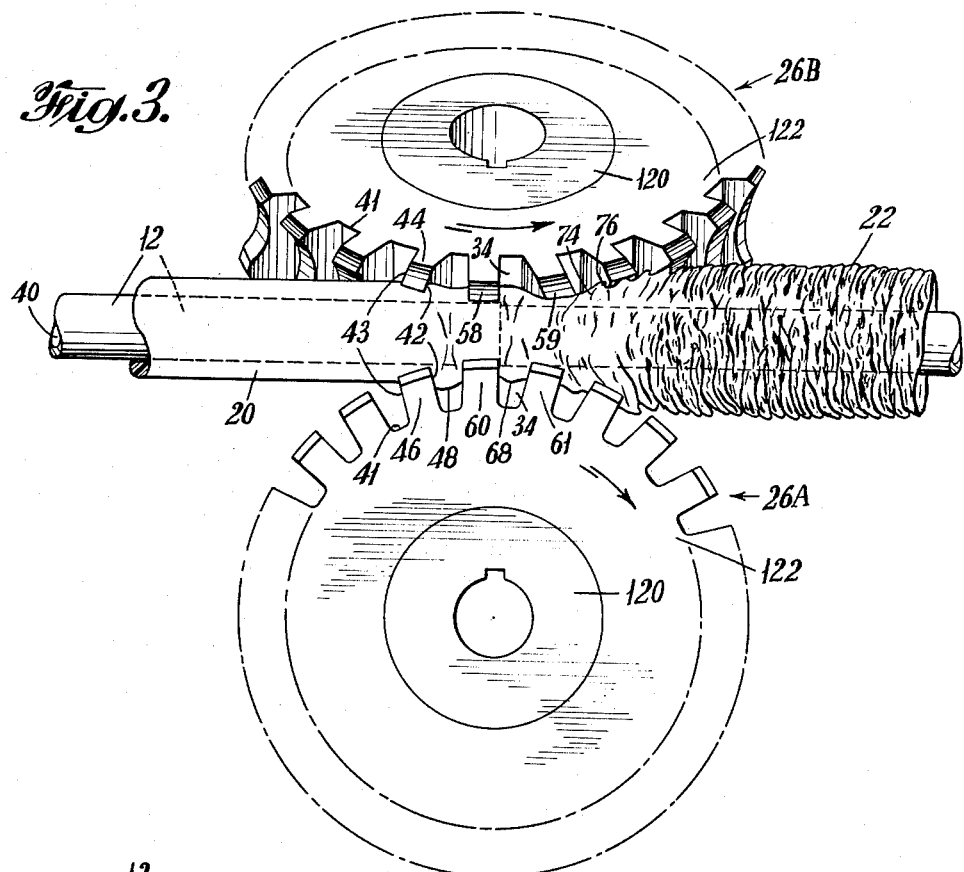
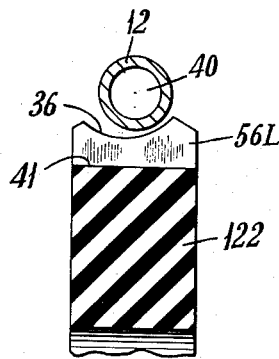
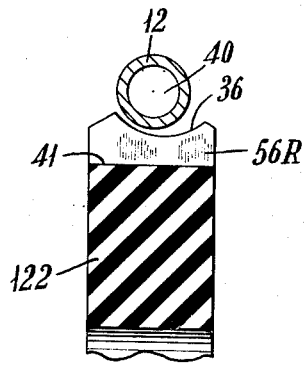
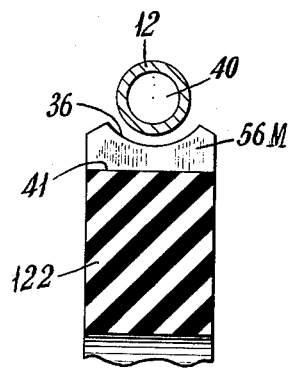
INVENTOR.
EDWARD A. MATECKI
BY
ATTORNEY INVENTOR.
EDWARD A. MATECKI
BY E. J. Fischer
ATTORNEY INVENTOR.
EDWARD A. MATECKI
BY E. J. Fischer
ATTORNEY May 16, 1961 E. A. MATECKI 2,984,574
SHIRRED CELLULOSIC SAUSAGE CASING AND
METHOD OF MANUFACTURE
Filed Oct. 20, 1958 8 Sheets-Sheet 6

INVENTOR.
EDWARD A. MATECKI
BY E. J. Fischer
ATTORNEY

INVENTOR.
EDWARD A. MATECKI
BY
ATTORNEY

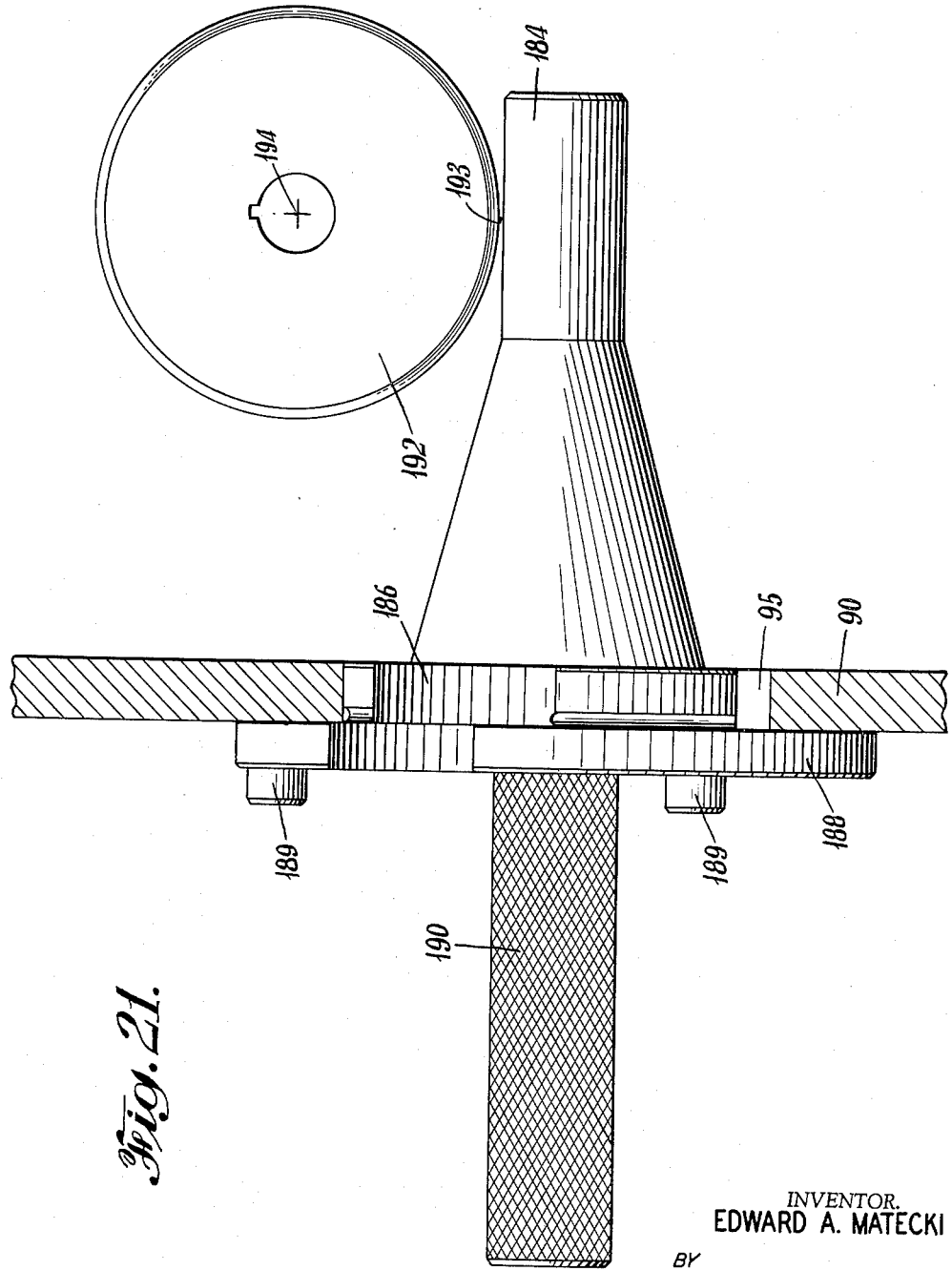

2,984,574
SHIRRED CELLULOSIC SAUSAGE CASING AND METHOD OF MANUFACTURE

Edward A. Matecki, Evergreen Park, Ill., assignor to Union Carbide Corporation, a corporation of New York Filed Oct. 20, 1958, Ser. No. 768,166

13 Claims. (Cl. 99—176)

This invention relates to the art of shirring sausage casings and more particularly to sausage casings of regenerated cellulose.

Cellulose (regenerated) casings are used extensively in the manufacture of skinless frankfurters and wieners. In practice, a cellulosic tube of an appropriate length, such as 32′, 40′, 55′, or more is shirred and then compressed to produce (what is commonly termed in the art) a stick of from about 6″ to 10″ in length, and such stick is positioned on a horn of a stuffing apparatus and thereafter stuffed. The stuffed tube is then linked and processed as is well known in the art to produce skinless frankfurters.

In the commercial manufacture of frankfurters and other sausage products, the meat packer for reasons of economy and to speed up the stuffing operation, demands a shirred sausage casing in the form of a stick highly compressed in length, and with a large internal hole. Such form is desirable to permit easy and speedy placing of the casing onto a meat stuffing horn, the large hole of the shirred casing permitting the use of larger diameter stuffing horns and thus enabling more rapid filling of the casing.

Sausage stuffing horns are commonly made of thin-walled metal tubing, which are affixed and connected to pressurized containers of meat emulsion. Flow of the meat emulsion from the pressurized container to the stuffing horn is controlled by a stop cock. Greater speed in the stuffing operation demands more rapid and uniform filling of each stick of casing successively applied to the stuffing horn. While some improvement in throughput of meat emulsion through stuffing horns can be accomplished by increasing the pressure on the meat emulsion, such measure is limited as excessive pressures may cause adverse changes in the basic structure of the meat emulsion.

A technical study was made of stuffing variables such as horn length and diameter, meat emulsion viscosity, pressure, and casing characteristics on the stuffing throughput for commonly used sausage emulsions. A summary of the basic data experimentally determined was resolved into a formula for frankfurter emulsions stuffing throughput which is:

$$W = K \times \frac{D^{4+} \times P^{3+}}{L^{2-} \times V^{3+}}$$

where $W$ = throughput of emulsion in grams/second
$K$ = dimensional constant
$D$ = horn inside diameter, in inches
$P$ = stuffing pressure, in pounds/square inch
$L$ = horn length, in inches
$V$ = emulsion viscosity, in centipoises Accordingly, the throughput of meat emulsions commonly used in stuffing frankfurters may be varied directly as approximately the fourth power of the filling tube internal diameter; and inversely as approximately the square of the horn length and the cube of the viscosity. Thus a shirred casing with a larger hole size permits the use of a larger diameter stuffing horn, thereby permitting greater meat throughput and shortening the time of the filling cycle. Such an improvement is of considerable commercial importance to meat packers.

An object of this invention is to provide shirred and compressed cellulosic sausage casings of maximum hole diameter for a specific length, for more rapid stuffing therein of sausage meat emulsion.

Another object of this invention is to provide shirred and compressed cellulosic sausage casing of a shorter length for a specific hole diameter.

An additional object of this invention is to provide shirred and compressed cellulosic sausage casing wherein the pleated or wrinkled casing wall is efficiently distributed circumaxially with respect to the internal hole.

A further object of this invention is to provide shirred and compressed cellulosic sausage casing characterized by uniform filling and by smooth deshirring from the exit end of sausage stuffing horns.

Another object of this invention is to provide an improved method of collapsing cellulosic tubing in a helical pattern to yield a shirred casing of maximum hole size from a tubing of a given diameter.

Still another object of this invention is to provide a method of shirring cellulosic casing yielding more uniform displacement of the casing around the mandrel upon which the casing is shirred.

A further object of this invention is to provide novel shirring apparatus for helically shirring cellulosic casing.

Another object of this invention is to provide shirring apparatus capable of rapidly shirring cellulosic casing with minimum damage thereto.

Another object of this invention is to provide shirring apparatus which is readily adjustable to shirr casings of different diameters.

Other and further objects will become apparent hereinafter.

According to this invention there is provided an elongate shirred and compressed stick of regenerated cellulose tubing substantially circular in cross section having an internal hole of predetermined size and a substantially cylindrical exterior surface, said tubing having its wall longitudinally collapsed into an ordered repeated shirred pattern of at least three discrete, successive, longitudinally collapsed sections of casing, the collapsed sections in said pattern being successively angularly disposed with respect to each other in overlapping helical relationship about the axis of the hole. Preferably the collapsed sections are successively equiangularly displaced about the axis of the hole to obtain a shirred stick having a maximum hole diameter for a specific length thereof.

The shirring of cellulosic casing according to this invention is accomplished by inflating cellulosic casing to a self-supporting tubular shape, continuously moving the inflated casing concentrically over a mandrel of smaller diameter than the inflated casing to and through an eccentrically gyrating passage of smaller cross-sectional area than the inflated casing but larger than the mandrel, said passage being formed by a plurality of identical, synchronously rotating rolls each having a peripheral surface of spaced saddle shaped cogs and with said rolls being equidistantly spaced from the mandrel axis, the saddles of the respective rolls sequentially mating together at said passage to circumferentially grip and indent successive discrete sections of the casing and orbitally displacing said casing sections from its concentric relationship with the mandrel, and continuously gathering the displaced sections of casing into a uniform helically pleated shirred tube by retarding the forward movement of casing leaving the gyrating passage; the shirring operation is continued until a tube of predetermined length has been shirred. The shirred tube is then compressed forcing the pleats into close mutually supporting relation, thus forming a self-sustaining stick of casing.

The coaction of several rotating shirring rolls to form a gyrating passage is dependent upon a cogged peripheral surface thereon in the form of uniformly spaced individual saddle shaped projections of arcuate cross-section. The arcuate cross-section of each saddle is of such height and configuration to cause a supporting engagement and indentation of a portion of the casing periphery coming into contact therewith but without forcing the casing wall into contact with the mandrel surface. By simultaneously bringing together an opposing suitably shaped cog of each shirring roll into abutting relationship there is thereby formed a passage for the casing. The passage depending upon the height and lateral displacement of each saddle with respect to the center line of its roll is formed essentially by a plurality of arcs of circles and should be eccentric with the mandrel. With suitable positioning of successive cogs of various heights and lateral displacement around each roll as will be hereafter shown there can be provided a sequential gyrating eccentric passage whereby the moving casing is progressively helically displaced with respect to the mandrel surface.

At least three identical cogged shirring rolls are employed in order to obtain a shirred casing of substantially circular cross section. Shirring apparatus having more than three shirring rolls further improves the roundness of the shirred casing and similarly yielding a larger hole or a shorter stick, or both.

The shirring action of the cogged surfaced rolls begins with the initial contact of the casing periphery by the leading edge of a saddle in each roll. As each of said cogs approaches a perpendicular position with respect to the mandrel axis, the section of casing immediately ahead of the cogs' leading edges bulges outwardly from the mandrel and into recessed spaces between the cogs. Depending on the eccentricity of the passage formed by directly opposing cogs with respect to the mandrel, the bulged section of the casing can be of oval, or like arcuate shape, and substantially a similar cross-sectional pattern is retained upon the collapsing of the section. In the contacting of the casing by the cogs and the formation of the bulge, creasing and wrinkling are initiated in the surface of the casing affected. With further rotation of the rolls, the bulge of casing is progressively collapsed since the bulge is confined within the recessed spaces and is utimately collapsed and confined on the mandrel into a cone-like formation against the already shirred casing by the shirring cogs, since there is a retarding force applied to the casing after passage through the rolls. In the collapsing of the bulges a matrix of small wrinkles or folds is formed in the casing wall.

The oval-shaped configuration provides for maximum circumaxial displacement of the casing and hence a compressed shirred stick of greater hole size and shorter length, since oval-shaped sections are consecutively placed in helically staggered overlapping relationship along the length of the casing by the action of the gyrating passage.

Lubrication of the shirring saddles of the rolls and the interior of the cellulosic casing with a suitable lubricant is essential to facilitate pleating of the casing and to avoid abrasion damage thereto.

Retarding of the forward movement of the shirred casing can be provided by means effective to engage the shirred tube after passage through the shirring rolls and to advance the shirred tube away therefrom at a metered rate considerably less than that of the shirring rolls.

The nature of the invention and the manner in which it can be practiced will be further understood from the following detailed description which taken in connection with the accompanying drawings illustrating several embodiments of the invention and wherein Fig. 1 is a side elevational view (diagrammatic) of a shirring apparatus, being one embodiment of the present invention;

Fig. 3 is a side elevational view partly in section, with one of the shirring rolls not shown in order to illustrate the cooperative action of the cogged shirring rolls in indenting, gripping, and folding the casing into a pleated or wrinkled structure as diagrammatically shown;

Fig. 4 is a sectional view of a portion of the shirring rolls of Figs. 2 and 3 and showing the profile of a left-inclined cog;

Fig. 5 is a sectional view of another portion of the shirring rolls of Figs. 2 and 3 and showing the profile of a right-inclined cog;

Fig. 6 is a sectional view of still another portion of the shirring rolls of Figs. 2 and 3 and showing the profile of a medial cog;

Fig. 21 is an elevational view of a plug gauge for checking the radial alignment of the shirring rolls with respect to the mandrel.

Figure 1:
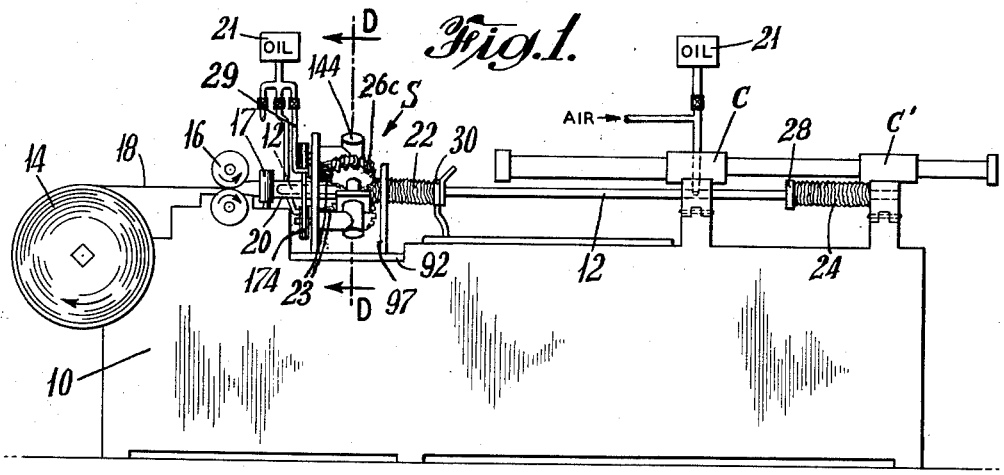

Referring now to the drawing wherein several embodiments of the invention are shown and like reference numerals and characters designate like parts, in Fig. 1 the reference numeral 10 designates a power driven shirring machine wherein a supply of flattened tubing such as cellulosic tubing 18 in intermittently withdrawn from a supply reel 14 in measured lengths, such as 40', 44', 55', by a pair of horizontally mounted metering rolls 16 and is guided into a "zone of shirring" S by vertically mounted guide rolls 17. The flattened tubing 18 is advanced through metering rolls 16, expanded to inflated tubing 20 as by gaseous means and guided onto and by a hollow mandrel 12 to a "zone of shirring" S. The mandrel supplies the gaseous means through an internal hole 40 shown in Fig. 2 and is releasably held in position by clamps C and C'.

The gaseous means which, for example, may be air under a pressure of about six pounds per square inch gauge is supplied from any convenient source to the bore of mandrel 12, as by an internal passage through clamp C communicating with the bore of the mandrel through a radial opening in the mandrel wall. Metered quantities of oil are supplied to the air stream from an oil reservoir 21 whereby the oil is carried by the air through the bore 40 and is discharged at the end of the mandrel adjacent guide rolls 17 to lubricate the exterior surface of the mandrel and the interior surface of the casing 20.

As shown in Fig. 1, the basilar surfaces of the cogs are lubricated by brushes 23 to which a suitable lubricant is fed from an oil supply reservoir.

The desired length of inflated casing is loosely shirred in shirring zone S against a cooperatively yielding holdback member 30 and the shirred casing 22 then is cut off from a subsequent length of shirred casing at a point adjacent to vertical member 97, the cut length is moved through opened clamp C and compressed to lengths such as 7" to 12" by compressing member 28, resulting in a compressed, shirred casing 24. The shirred compressed stick of casing 24 is doffed from the mandrel 12 through opened clamp C' for packaging.

Figure 2:
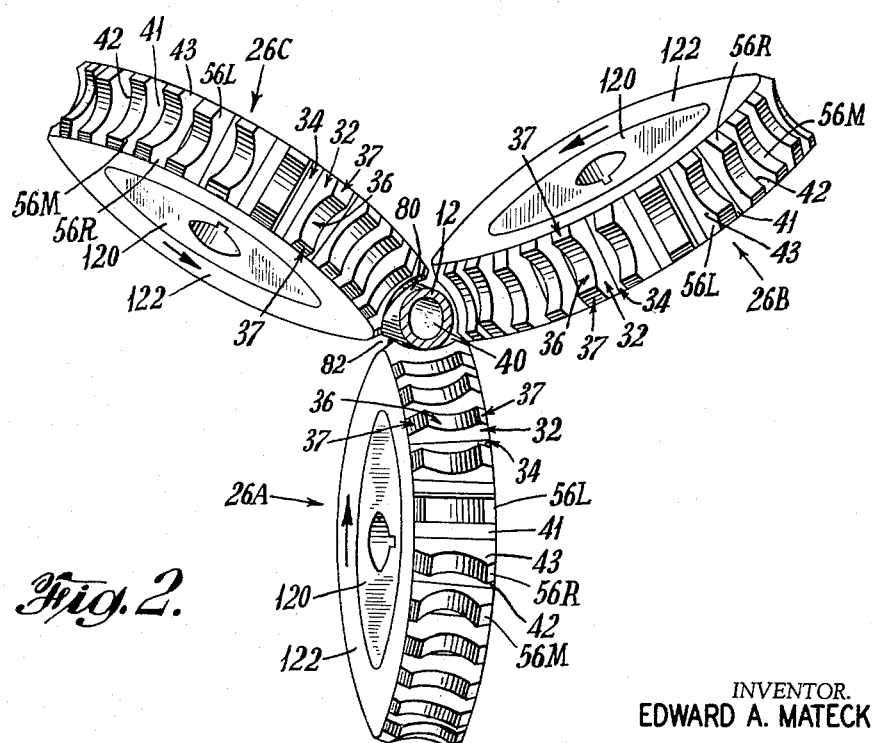
Fig. 2 is a perspective view of a shirring apparatus having three identical cogged shirring rolls as positioned in the shirring zone with the mandrel being shown in section at the central passage formed by opposing cogs of the rolls.

Referring now to Fig. 2, the shirring means in a preferred embodiment is comprised of three identical keyed cogged shirring rolls 26A, 26B, 26C rotatably mounted and disposed equiangularly (120°) around the shirring mandrel 12 and spaced equidistantly from the axis of mandrel 12 to from passage 80 around the mandrel 12. Each of the rolls 26A, 26B, 26C are independently adjustable (as shown in greater detail in Figs. 13 and 14) relative to each other and to the passage 80 provided therebetween through which the mandrel 12 extends and the tubular casing to be shirred passes.

Each of rolls 26A, 26B, 26C consists of a metallic core 120 provided with a covering 122 of a suitable oil-resistant material such as rubber, plastic, and the like.

One suitable form of roll material is a synthetic rubber composition of 75°–85° Durometer hardness and with a surface finish of about 8 to 12 micro-inch (A.S.A. Standard B. 46.1—1947).

With continued reference to Fig. 2 it will be observed that the covering 122 has been machined or otherwise shaped into a plurality of saddle shaped cogs 32 with spaces 34 therebetween, extending inwardly to root periphery 41. Each of the cogs 32 has an arcuate basilar surface 36 located between beveled edges 37 which are of such angularity, for example 60°, to provide an operating clearance 82 such as from 0.002" to 0.015" between adjacent rolls. The radius of concavity of arcuate basilar surface 36 is at least equal to half the greatest cross-sectional dimension of the passage 80. The peripheral casing-contacting basilar surfaces 36 are formed in three shapes, and successively positioned as a plurality of recurring triads of cogs.

In Fig. 3 wherein one of the shirring rolls 26C is not shown in order to illustrate more clearly the shirring action of the three rolls, it will be seen that the leading edges 42 of opposing cogs 44 and 46 of rolls 26B and 26A, respectively, initially circumferentially indent the inflated casing 20, causing the casing 20 to be ballooned outwardly to form a slightly wrinkled or creased bulge 48. It will be observed that in the space 34 between cogs 58 and 59 of roll 26B and the space 34 between cogs 60 and 61 of roll 26A a bulge 68 similarly previously formed in the casing has been carried forward past the center line of the rolls 26B and 26A, and cog 59 of roll 26B and cog 61 of roll 26A are collapsing and further wrinkling and creasing a bulge 74 against already collapsed casing. It is to be understood that roll 26C not shown in Fig. 3 similarly coacts with the inflated casing 20.

Fig. 4 illustrates a left-inclined cog surface 56L made by locating the center of arcuate surface 36 to the left of the mandrel 12 vertical centerline.

Fig. 5 illustrates a right-inclined cog surface 56R made by locating the center of arcuate surface 36 to the right of the mandrel 12 vertical centerline.

Fig. 6 illustrates a medial cog surface 56M made by locating the center of arcuate surface 36 on the mandrel 12 vertical centerline.

Referring again to Fig. 2, each of rolls 26A, 26B, and 26C consists of a repeating plurality of triads of concave cog surfaces 56R, 56L, and 56M, each cog being saddle shaped. Each of the cogs has a leading edge surface 42 and trailing edge surface 43, and intermediate the respective leading and trailing edge surfaces, a basilar surface 36.

Figure 7:
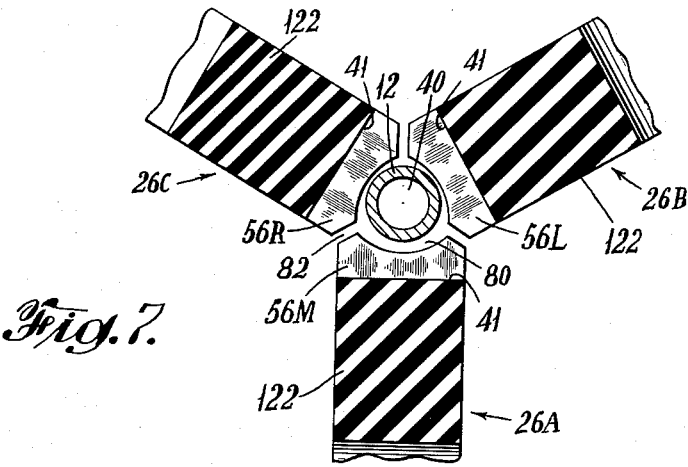
Fig. 7 is a sectional view taken generally along line D—D of Fig. 1, showing three opposing shirring cogs forming a central passage eccentrically disposed with respect to the shirring mandrel.

Referring to Fig. 7, the shirring rolls 26A, 26B, 26C are positioned to form the eccentric passage 80 of a size less than the diameter of the inflated tube 20 (not shown) passing therethrough, whereby each cog will indent the tube without causing it to contact the mandrel 12 and feed the tube forward. The first position of the rolls at the start of a triad shirring cycle shows roll 26A positioned with its cog 56M, roll 26B positioned with its cog 56L, and roll 26C positioned with its cog 56R, all of said cogs being directly opposed and mating over mandrel 12 to form passage 80 and with working clearances 82 intermediate their beveled edges, thereby orbitally displacing inflated casing 20 (not shown) downwardly toward the mandrel 12 and roll 26A.

Figure 8:
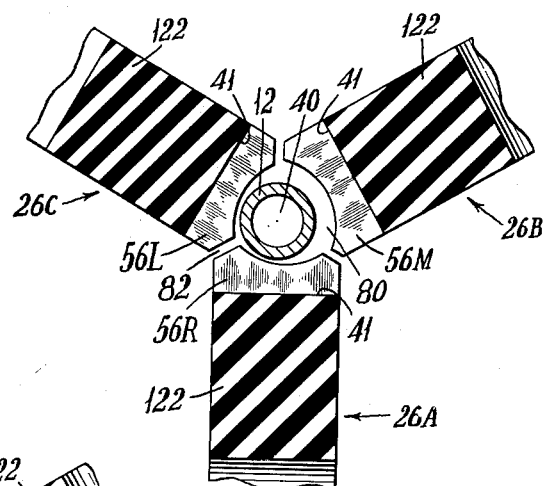
Fig. 8 is a sectional view similar to Fig. 7 showing a second set of three shirring cogs also forming a central passage eccentrically disposed in another position.

Fig. 8, representing the rolls at the second part of the triad shirring cycle, shows roll 26A positioned with cog 56R, roll 26B positioned with cog 56M, roll 26C positioned with cog 56L mating to form passage 80 and with spaces 82 intermediate their beveled edges, thereby orbitally displacing the casing 20 (not shown) inwardly toward the mandrel 12 and roll 26B.

Figure 9:
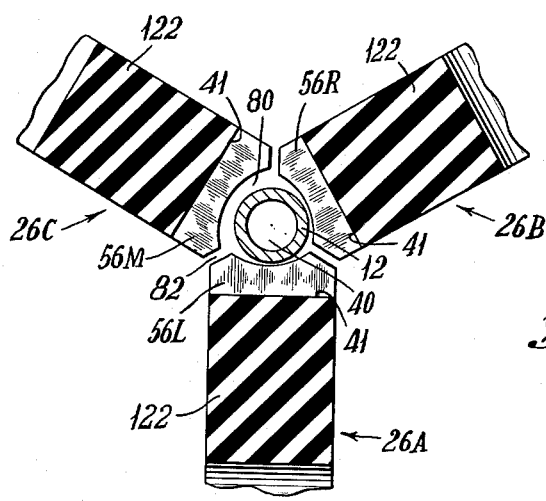
Fig. 9 is a sectional view similar to Fig. 7, showing a third set of shirring cogs forming a central passage of still different eccentricity to the mandrel.

Fig. 9, representing the rolls at the third part of the shirring cycle, shows roll 26A positioned with cog 56L, roll 26B positioned with cog 56R, roll 26C positioned with cog 56M mating to form passage 80 and with space 82 intermediate their beveled edges, thereby orbitally displacing casing 20 (not shown) inwardly toward the mandrel 12 and roll 26C.

Thus, as the three rolls 26A, 26B, and 26C are rotated by appropriate driving means, the eccentric passage 80 is repeatedly gyrated about the center of mandrel 12, successively through configurations of Figs. 7, 8, and 9 and thereby similarly successively displacing discrete sections of inflated casing 20 from a concentric position with respect to the mandrel 12.

Figure 10:
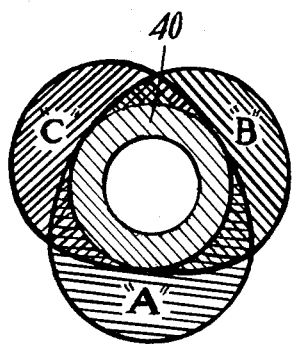
Fig. 10 is a slightly enlarged section taken generally along line D—D of Fig. 1 showing three superimposed casing sections as successively eccentrically displaced from the mandrel by successive groups of opposing cogs.

Referring now to Fig. 10 which is drawn as an enlarged section along line D—D of Fig. 1, the several shaded sections together forming a trefoil pattern depict the perimeters of and the overlapping of successive ovate sections "A," "B," "C," in the casing as respectively imparted thereto in moving through the gyrating passage 80 of Figs. 7, 8, and 9. The trefoil distribution of discrete casing sections producing a stick having a substantially cylindrical outer surface is a highly desirable improvement, because the ovate sections are circumaxially distributed over a substantially greater area such as 12 percent greater than prior structures and thereby disposing a lesser number of tubing wall sections axially adjacent each other. Thus, with the new method, an equal length of tubing of given wall thickness may be shirred and compressed to a shorter length or larger hole, or both.

Figure 11:
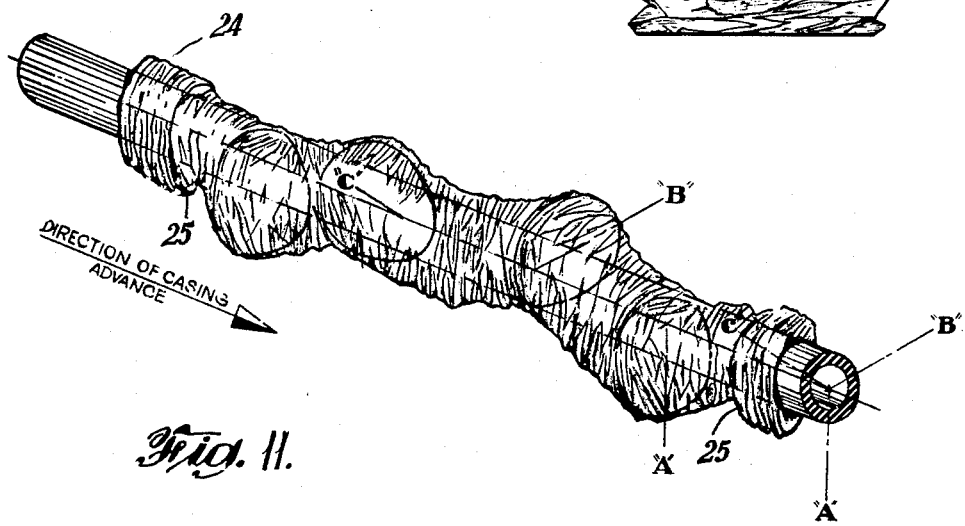
Fig. 11 is a slightly enlarged perspective view substantially representing a shirred and compressed casing produced by the shirring rolls shown in Figs. 2 to 9, part of which has been deshirred to illustrate the helical positioning along the casing of the displaced casing sections shown in Fig. 10.

Fig. 11 is an enlarged diagrammatic perspective of casing shirred and compressed on the apparatus shown in Figs. 1–9 and then deshirred in place on mandrel 12. It will be noted that the substantially helical arrangement of discrete casing sections made by advancing the tubing to and through the gyrating passage 80, essentially comprises a series of helically positioned ovate sections "A," "B," "C" together with a portion of the casing wall material on each side thereof, said ovate sections corresponding to those shown in Fig. 10. The folds of the shirred and collapsed casing 24 overlie each other due to the wiping action of the cogs in collapsing the casing wall against already collapsed casing, the overlying being shown by the conical formations 25.

Figure 12:
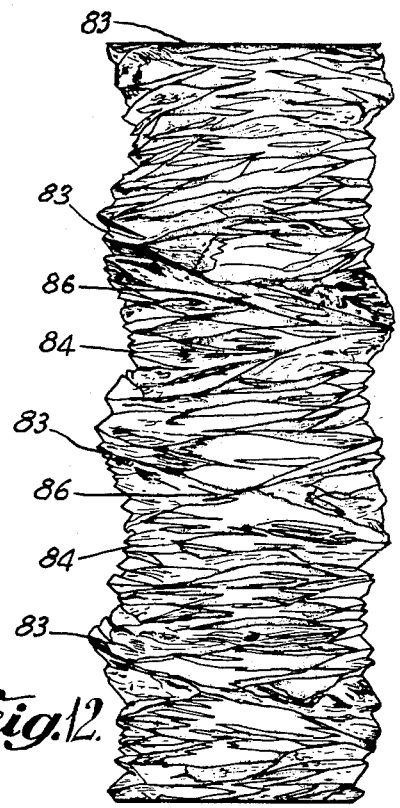
Fig. 12 is a photographic representation of the lower half of the deshirred portion of the shirred casing shown in Fig. 11.

Fig. 12 is a photographic representation of the lower half of the deshirred portion of the shirred casing shown in Fig. 11. It will be observed that there are four transverse diagonal ridge-like portions 83 which are indicative of the substantially helical shirred pattern consisting of collapsed overlapping ovate sections of casing. Centrally of these ridge-like portions are V-shaped intersecting wrinkles or creases 84, the apexes 86 of which correspond in position to the midpoints of the base or bulbous portions of ovate sections "A" shown in Fig. 11 and thus correspond in position to the sections of casing wall material collapsed by successive medial cogs in roll 26A.

Apexes formed by the medial cogs of rolls 26B and 26C are not shown in Fig. 12 but are present in the shirred casing wall spaced approximately 120° around the casing from the apexes shown and correspond in position to the base or bulbous portions of ovate sections or displacements "B" and "C" as shown in Fig. 11.

One actual form of apparatus according to the invention was constructed and operated by means of a three-roll apparatus as illustrated in Figs. 1–9 and 13–14A, to shirr casing of 26/32" inflated diameter at the rate of 420 ft. per minute of casing length, said casing being inflated with air at a pressure of six to seven pounds per square inch gauge and being lubricated with a suitable oil. Suitable lubricants include water-white U.S. Pharmacopoeia white mineral oil of Saybolt viscosity from 76° to 80° cotton seed oil, soya oil, and glycerine. Lubricant in minimal amount to keep the mandrel and saddle surfaces coated was ordinarily from about 0.0002 gram to 0.0013 gram per 6-inch length (frankfurter length) of casing being shirred.

In repeated operations 55 ft. lengths of casing stock were shirred on a mandrel of 0.62 inch diameter slightly reduced in diameter following the shirring zone to facilitate the movement of casing therealong, to a compressed length of about 8¾ inches, the movement of the shirred casing along the mandrel being retarded by a holdback mechanism 30 to a rate of one inch for each two feet of unshirred casing.

The specifications of the rolls 26A, B, C, in such constructed apparatus being as follows:

| | |
|---|---|
| Roll thickness | One inch. |
| Overall diameter | 4 inches. |
| Root diameter 41 of spaces between cogs | 3.24 inches. |
| Total number of cogs on each roll | 24. |
| Thickness of each cog | About ¼ inch. |
| Space between each cog | About 3/16 inch. |
| Radius of all basilar surfaces 36 | 0.47 inch. |
| Center of radius of medial cog basilar surface (Fig. 6) | Lies on roll vertical center line and 2.21 inches from roll axis. |
| Center of radius of right inclined cog basilar surface (Fig. 5) | Lies on a vertical line 0.070 inch displaced to the right of roll vertical center line and 2.33 inches from roll axis. |
| Center of radius of left inclined cog basilar surface (Fig. 4) | Same as right inclined cog but displaced to the left of roll vertical center line. |

The 24 sequential mating positions of the respective cogs in said rolls occuring during one complete revolution thereof, each position forming a passage for the mandrel and the casing, are as follows:

| Mating Position | Cog of Roll 26A | Cog of Roll 26B | Cog of Roll 26C |
|---|---|---|---|
| 1 | Medial | Left inclined | Right inclined. |
| 2 | Right inclined | Medial | Left inclined. |
| 3 | Left inclined | Right inclined | Medial. |
| 4 | Medial | Left inclined | Right inclined. |
| 5 | Right inclined | Medial | Left inclined. |
| 6 | Left inclined | Right inclined | Medial. |
| 7 | Medial | Left inclined | Right inclined. |
| 8 | Right inclined | Medial | Left inclined. |
| 9 | Left inclined | Right inclined | Medial. |
| 10 | Medial | Left inclined | Right inclined. |
| 11 | Right inclined | Medial | Left inclined. |
| 12 | Left inclined | Right inclined | Medial. |
| 13 | Medial | Left inclined | Right inclined. |
| 14 | Right inclined | Medial | Left inclined. |
| 15 | Left inclined | Right inclined | Medial. |
| 16 | Medial | Left inclined | Right inclined. |
| 17 | Right inclined | Medial | Left inclined. |
| 18 | Left inclined | Right inclined | Medial. |
| 19 | Medial | Left inclined | Right inclined. |
| 20 | Right inclined | Medial | Left inclined. |
| 21 | Left inclined | Right inclined | Medial. |
| 22 | Medial | Left inclined | Right inclined. |
| 23 | Right inclined | Medial | Left inclined. |
| 24 | Left inclined | Right inclined | Medial. |

In the above described embodiment, the 24 cogs of each roll constitute eight repeating triad cog patterns. It is to be understood, however, that the total number of triad cog patterns on a shirring roll periphery can be less or more than 24. For example, a similar set of shirring rolls 26A, 26B, 26C of substantially the same diameter but containing each only six triad cog patterns in their periphery (18 cogs in all consisting of six medial cogs, six left inclined cogs, and six right inclined cogs) and with the spaces between the cogs being proportionately wider produced compressed shirred sticks averaging 8 inches in length, from 55 ft. lengths of 26/32" inflated diameter tubular cellulosic casing stock. The wider spacing of the cogs in this embodiment effecting greater circumaxial displacement of the casing and thus producing a shorter compressed shirred stick than the previously described embodiment employing 24 cogs in each roll's periphery.

Figure 13:
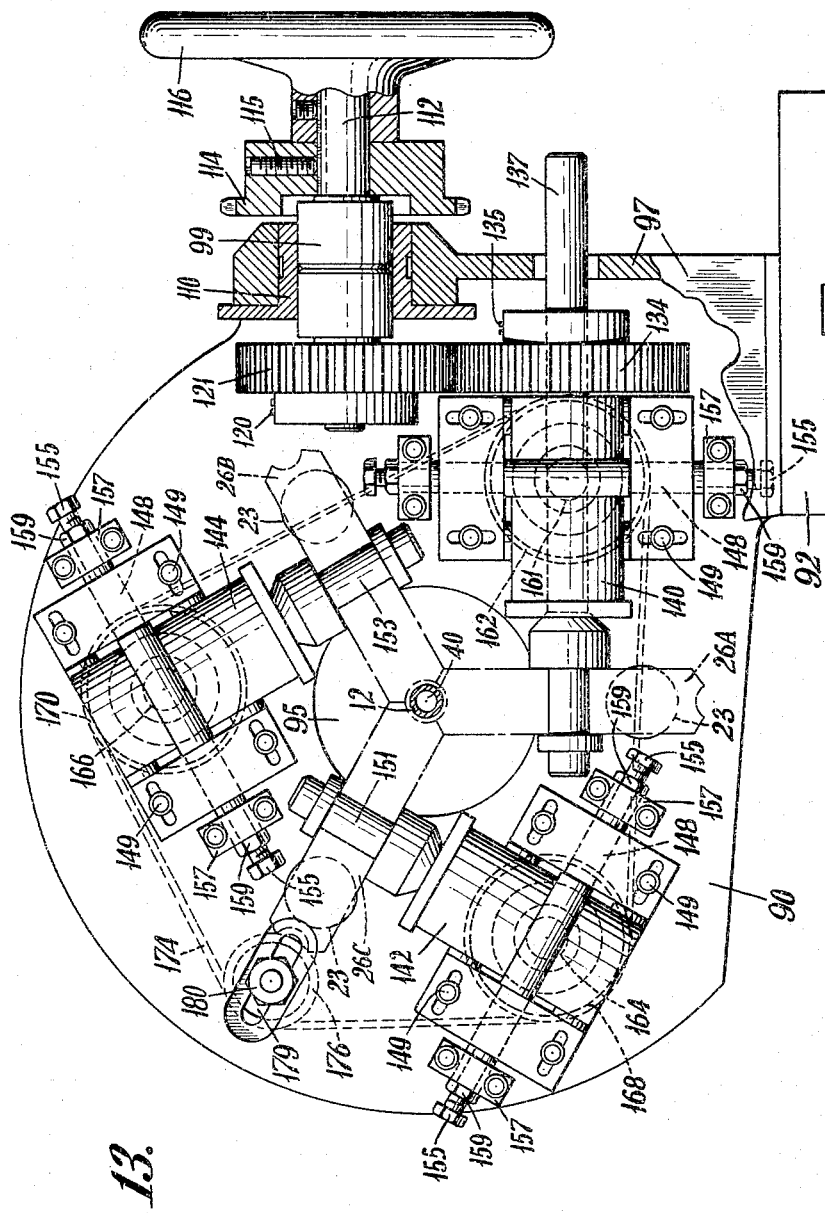
Fig. 13 is an enlarged elevational view of a synchronized driving mechanism for the shirring roll apparatus of Figs. 1 to 9.
Figure 14:
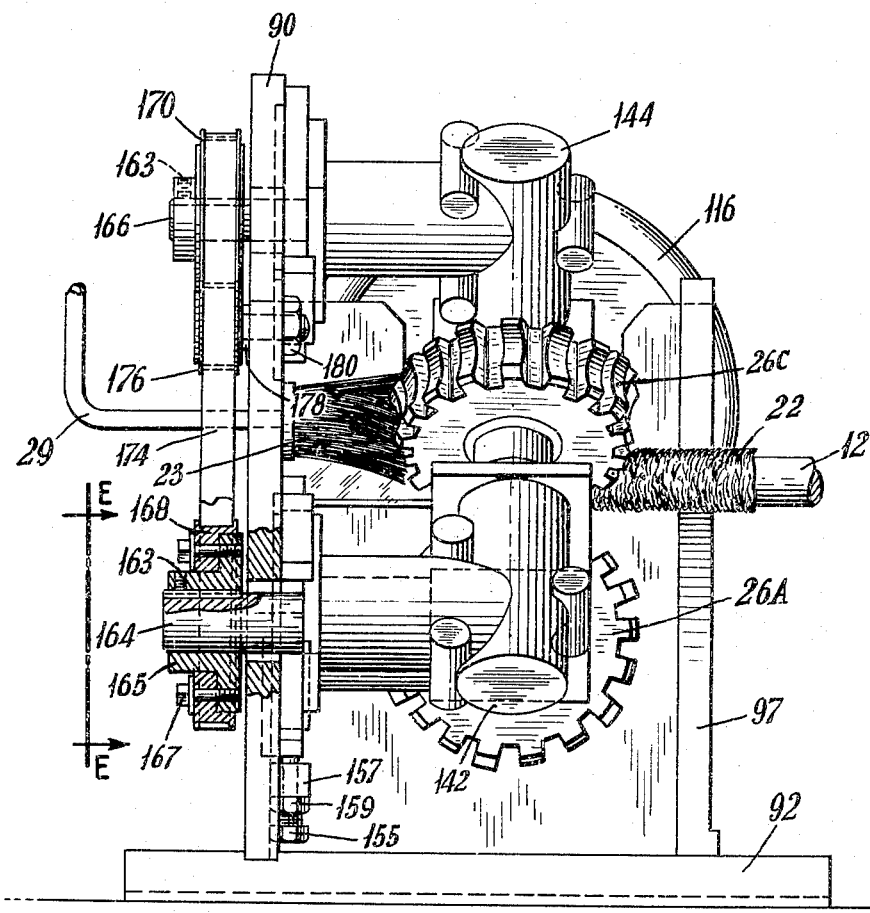
Fig. 14 is a side elevational view of the roll driving mechanism shown in Fig. 13.
Figure 14A:
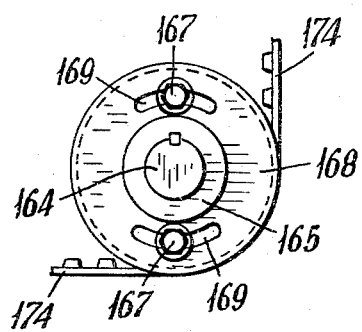
Fig. 14A is an end elevational view of an adjustable timing belt pulley taken substantially in the direction of arrows E—E of Fig. 14.

Means for radial adjustment and cog alignment of the three-roll shirring apparatus of Figs. 2 to 9 are shown in greater detail by Figs. 13, 14 and 14A. As there shown, the rolls 26A, 26B, and 26C, basilar surface lubricating brushes 23 connected to oil supply line 29 and means for synchronously rotating each roll are mounted on a vertical plate member 90 secured to a base member 92. An opening 95 concentric with the mandrel 12 is provided in plate 90. A vertical bracket member 97 is fastened to the base 92 and forms a right angle with respect to plate member 90. An eccentric bushing 110 is suitably secured to bracket 97. A rotatable shaft 112 extends through and is supported by an anti-friction ball bearing assembly 99 which is press-fitted into the eccentric bushing 110. Rotation of bushing 110 eccentrically lowers or raises shaft 112. Near the outer end of shaft 112 is fastened a sprocket gear 114 by means of a set screw 115. A hand wheel 116 is fastened by a set screw on the shaft 112 adjacent to sprocket gear 114 and is employed for manual rotation of the several parts when threading the casing into and when adjusting the apparatus.

Sprocket gear 114 is driven by a sprocket chain (not shown) connected to an electric motor or other suitable driving means (not shown).

Fastened to the inner end of shaft 112 by means of a set screw 120 is a spur gear 121 which is meshed with a spur gear 134 fastened by means of set screw 135 to the outer end of a drive shaft 137, extending from a right angle enclosed miter gear box 140 hereinafter referred to as the master drive gear box. Shirring roll 26A is keyed to the end of drive shaft 137 extending from the other side of gear box 140 and accordingly rotates at the same speed as spur gear 134.

Right angle master miter gear box 140 and similar slave driven miter gear boxes 142 and 144 are equiangularly spaced about the opening 95 in vertical plate 90 and are secured to the face of plate 90 by cap screws 149 extending through slotted openings in the base of each gear box. Upon cap screws 149 being loosened, each gear box can be shifted back and forth on keyway 148 formed in plate 90 in a direction perpendicular to the driveshafts 137, 151, 153 respectively of each gear box 140, 142, 144. Adjustment screws 155 threadably engaged with internally threaded bosses 157 which are integral with vertical plate 90, bear on each end of the gear boxes 140, 142, and 144 to accurately position said gear boxes. Lock nuts 159 on each adjustment screw are employed to lock said gear boxes in adjusted position.

A rotating shaft 161 extends from the base of master drive gear box 140 through an opening in vertical plate member 90 and it rotates at the same speed as driving shaft 137 upon which roll 26A is fastened. A cogged pulley 162 is secured by a set screw (not shown) to the end of shaft 161 projecting through plate member 90.

Slave gear boxes 142 and 144 respectively have rotating shafts 164 and 166 extending through openings in vertical plate 90 and have cogged pulleys 168 and 170 secured thereto. Pulleys 168 and 170 are identical to cogged pulley 162 of master gear box 140 whereby its cogged pulley 162 by means of cogged flexible belt 174 drives all pulleys at the same rotational speed. A non-slipping contact of cogged belt 174 with the surfaces of all the pulleys is maintained by idler pulley 176 rotating on a shaft 178 extending through a slotted opening 179 in vertical plate member 90 and locked in position by nut 180.

As further shown in Fig. 14A, each of said cogged pulleys 162, 168, and 170 are mounted on a flanged hub 165 by means of bolts 167 extending through slotted openings 169 in the pulleys and threaded into the flanges of hubs 165 whereby the pulleys can be rotated through a limited arc with respect to the keyed mounted position of hub 165 for purposes of alignment adjustment of rolls 26A, B, C. The hubs 165 are keyed to their respective shafts and further secured thereto by set screws 163.

Slave gear boxes 142 and 144 each have respectively a rotating output shaft 151, 153 to which is keyed or otherwise securely fastened shirring rolls 26C and 26B respectively. It is to be understood that each of said rolls 26A, 26B, and 26C all rotate at the same speed.

Precise peripheral alignment of shirring rolls 26A, 26B, and 26C with respect to mandrel 12 is obtained by employing a plug gauge as shown in Fig. 21. The plug gauge comprises a cylindrical projection 184 having a diameter twice the distance between basilar surface 36 and the centerline of mandrel 12. The cylindrical projection 184 tapers outwardly in extension to a cylindrical plate surface 186 having a diameter equivalent to machine fit with the opening 95 in vertical plate member 90.

A shoulder 188 on the gauge plug is provided with openings for temporarily holding the gauge against the rear side of plate member 90 by means of bolts 189. The gauge is provided with a handle 190 for convenience in use.

In initially setting up and aligning the shirring rolls of the apparatus, all the shirring rolls 26A, 26B, and 26C are removed from their respective shafts 137, 153, and 151, and a plain surface gauge wheel 192 having a diameter slightly less than (such as 0.020" less) twice the radial distance from the centerline 194 of roll 26 to basilar surface 36. By measuring the space 193 between projection 184 and gauge wheel 192 as with a leaf gauge, accurate location of roll centerline 194 is readily obtained. After each of the gear boxes 140, 142, and 144 has thereby been properly positioned with the aid of adjustment screws 155, the gear boxes are securely fastened into position by tightening cap screws 149. After the adjustment has been made, the plain surfaced gauge wheel 192 is removed, and shirring rolls 26A, 26B, and 26C are keyed in place.

Mating of the cogs is produced by adjustment of the slotted drive pulleys as illustrated in Figs. 14 and 14A.

Figure 16:
Fig. 16 is a partial sectional view of the roll shown in Fig. 15 and showing the profile of a right inclined high cog.
Figure 17:
Fig. 17 is similar to Fig. 16 but shows the profile of a left inclined high cog.
Figure 18:
Fig. 18 is also similar to Fig. 16 but shows the profile of a left inclined low cog.
Figure 19:
Fig. 19 is also similar to Fig. 16 but shows the profile of a right inclined low cog.

As was previously stated, a four-roll shirring apparatus constitutes another embodiment of this invention. A shirring roll suitable for such apparatus is shown in Fig. 15, and it has a repeating tetrad sequence of different saddle shaped cogs around its periphery, consisting of a right inclined high cog whose profile is shown in Fig. 16, followed by a left inclined high cog whose profile is shown in Fig. 17, followed in turn by a left inclined low cog whose profile is shown in Fig. 18, and it in turn by right inclined low cog whose profile is as shown in Fig. 19.

Figure 15:
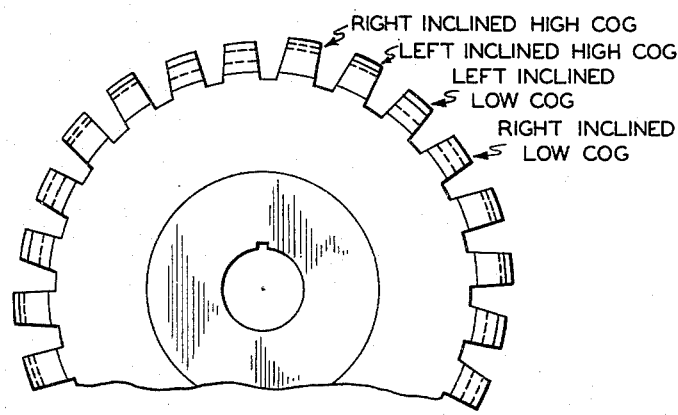
Fig. 15 is a side elevational view of a cogged shirring roll employed in an embodiment of a four-roll shirring apparatus.
Figure 20:
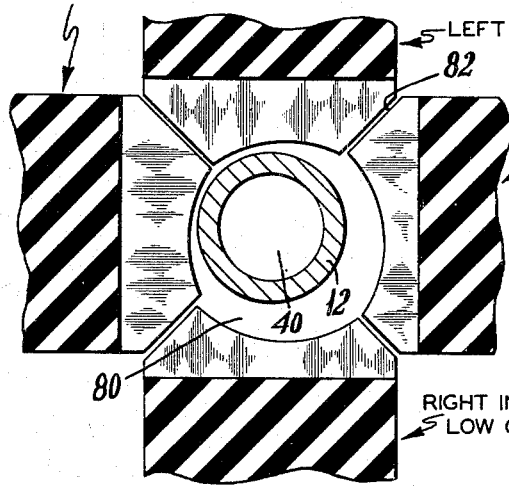
Fig. 20 is a sectional view taken generally along line D—D of Fig. 1 of a shirring apparatus embodiment having four opposed shirring rolls to form a central passage through which the shirring mandrel extends.

Four identical shirring rolls as illustrated in Fig. 15 and mounted as shown in Fig. 20 produced shirred casing having a helical pattern similar to that illustrated in Fig. 12. In the instance of shirring regenerated cellulose tubing of 26/32" inflated diameter, four rolls identical to Fig. 15 were employed, each having a diameter of 4 inches and each containing six repetitive tetrad sequences of the cogs whose profiles are illustrated in Figs. 16 to 19.

Fig. 20 depicts one of the four orbitally displaced passages 80 formed by the abutting cogs of the four rolls. The other three passages are sequentially formed as the rolls are synchronously rotated whereby a gyrating passage is formed and the casing helically folded similarly to that illustrated in Fig. 11 for the three-roll embodiment, but differing therefrom in that the helix is produced by four superimposed ovoid-shaped sections instead of the three sections in Fig. 11.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A tubular cellulosic sausage casing shirred and compressed into a tubular stick having a hole of predetermined size and a substantially cylindrical outer surface, said stick having an ordered repeated shirred pattern of at least three discrete, successive, longitudinally collapsed sections of casing each having an ovate cross section, the collapsed ovate sections in said pattern being successively angularly disposed with respect to each other in overlapping helical relationship about the axis of the hole.

2. A tubular cellulosic sausage casing shirred and compressed into a tubular stick having a hole of predetermined size and a substantially cylindrical outer surface, said stick having an ordered repeated shirred pattern of at least three discrete, successive, longitudinally collapsed sections of casing each having an ovate cross section, the collapsed ovate sections in said pattern being successively equiangularly disposed with respect to each other in overlapping helical relationship about the axis of the hole.

3. A tubular cellulosic sausage casing shirred and compressed into a tubular stick having a hole of predetermined size and a substantially cylindrical outer surface, said stick having an ordered repeated shirred pattern of at least three discrete, successive, longitudinally collapsed sections of casing, each section having an ovate cross section with the base thereof being adjacent to the outer cylindrical surface, the collapsed sections in said pattern being successively angularly disposed with respect to each other in overlapping helical relationship about the axis of the hole.

4. A tubular cellulosic sausage casing shirred and compressed into a tubular stick having a hole of predetermined size and a substantially cylindrical outer surface, said stick having an ordered repeated shirred trefoil pattern of three discrete, successive, longitudinally collapsed sections of casing, each section having an ovate cross section witth the base thereof being adjacent to the outer cylindrical surface, the collapsed sections in said pattern being successively equiangularly disposed with respect to each other in overlapping helical relationship about the axis of the hole, the collapsed sections constituting a wrinkled and creased matrix.

5. A tubular cellulosic sausage casing shirred and compressed into a tubular stick having a hole of predetermined size and a substantially cylindrical outer surface, said stick having an ordered repeated shirred tetrad pattern of four discrete, successive, longitudinally collapsed sections of casing, each section having an ovate cross section with the base thereof being adjacent to the outer cylindrical surface, the collapsed sections in said pattern being successively equiangularly disposed with respect to each other in overlapping helical relationship about the axis of the hole, the collapsed sections constituting a wrinkled and creased matrix.

6. A tubular cellulosic sausage casing shirred and compressed into a tubular stick having a hole of predetermined size and a substantially cylindrical outer surface, said stick having an ordered repeated shirred pattern of at least three discrete, successive, longitudinally collapsed sections of casing, each section having an ovate cross section with the base thereof being adjacent to the outer cylindrical surface, the collapsed sections in said pattern being successively angularly disposed with respect to each other in conically overlapping helical relationship about the axis of the hole.

7. Method of shirring cellulosic sausage casing which comprises continuously moving a gaseous inflated cellulosic tubular casing concentrically over a mandrel, successively orbitally displacing discrete successive sections of said casing from its concentric relationship with the mandrel and gathering the successive sections into a uniformly pleated tube by retarding the movement of the casing subjected to orbital displacement.

8. Method of shirring cellulosic sausage casing which comprises inflating the casing, continuously moving the inflated casing concentrically over a mandrel to and through a gyrating passage of smaller dimensions than the inflated casing, successively gripping and orbitally displacing in said passage discrete lubricated sections of the casing from its concentric relationship with the mandrel, and gathering the orbitally displaced casing sections into a uniformly pleated tube by retarding the movement of the casing leaving the gyrating passage.

9. Method of shirring cellulosic sausage casing which comprises inflating the casing, continuously moving the inflated casing concentrically over a mandrel to and through a gyrating passage of smaller dimensions than the inflated casing, successively gripping and orbitally displacing in said passage discrete lubricated ovate sections of the casing from its concentric relationship with the mandrel, gathering the orbitally displaced casing sections into a uniformly pleated tube by retarding the movement of the casing leaving the gyrating passage, and compressing said pleats to form a shirred stick of casing.

10. Method of shirring cellulosic sausage casing which comprises continuously moving a gaseous inflated cellulosic tubular casing concentrically over a mandrel to and through a gyrating passage of smaller dimensions than the inflated casing, successively displacing in said passage discrete ovate sections of lubricated casing from its concentric relationship with the mandrel, said sections being helically displaced along the casing, gathering the displaced casing sections into a pleated tube by retarding the movement of the casing leaving the passage, and compressing said displaced sections to form a shirred stick of casing.

11. Method of shirring cellulosic sausage casing which comprises continuously moving a gaseous inflated tubular cellulosic casing concentrically over a mandrel to and through a gyrating circular passage of smaller diameter than the inflated casing and of larger diameter than the mandrel, helically collapsing said casing by orbitally displacing in said passage in a repeating trefoil pattern discrete successive ovate sections of lubricated casing from its concentric relationship with the mandrel, and gathering the orbitally displaced casing sections into a uniformly pleated tube by retarding the movement of the casing leaving the passage.

12. Method of shirring cellulosic sausage casing which comprises continuously moving a gaseous inflated tubular cellulosic casing concentrically over a mandrel to and through a gyrating passage of smaller dimensions than the inflated casing and of larger diameter than the mandrel, helically collapsing the casing by orbitally displacing the casing in said passage in a repeating tetrad pattern of discrete successive lburicated sections of casing helically staggered along the length of the casing, and gathering the orbitally displaced casing sections into a uniformly pleated tube by retarding the movement of the casing leaving the passage.

13. Method of shirring cellulosic sausage casing which comprises inflating cellulosic casing to a self-supporting tubular shape, interiorly and exteriorly lubricating the inflated casing surfaces, continuously moving the lubricated casing concentrically over a mandrel of smaller diameter than the inflated casing, circumferentially gripping and indenting successive discrete sections of the moving casing, orbitally displacing each gripped longitudinal casing section from its concentric relationship with the mandrel, collapsing each orbitally displaced section, angularly disposing the collapsed sections in overlapping helical relationship to each other, continuously gathering the displaced sections into a pleated, shirred tube, and then forming a self-sustaining, shirred stick of casing by compressing the pleats into mutual supporting relationship.

References Cited in the file of this patent

UNITED STATES PATENTS

| | | |
|---|---|---|
| 2,001,461 | Hewitt | May 14, 1935 |
| 2,583,654 | Korsgaard | Jan. 29, 1952 |
| 2,722,715 | Blizzard et al. | Nov. 8, 1955 |
| 2,723,201 | Blizzard et al. | Nov. 8, 1955 |

UNITED STATES PATENT OFFICE
CERTIFICATE OF CORRECTION

Patent No. 2,984,574            May 16, 1961

Edward A. Matecki

It is hereby certified that error appears in the above numbered patent requiring correction and that the said Letters Patent should read as corrected below.

Column 3, line 50, for "utimately" read -- ultimately --; column 4, line 43, strike out "photographic"; column 5, line 3, for "in" read -- is --; line 43, for "from" read -- form --; column 9, line 74, after "36" insert -- is installed --; column 12, line 36, for "lburicated" read -- lubricated --.

Signed and sealed this 6th day of November 1962.

(SEAL)
Attest:

ERNEST W. SWIDER
Attesting Officer

DAVID L. LADD
Commissioner of Patents